(12) United States Patent
Simili et al.

(10) Patent No.: US 9,973,120 B1
(45) Date of Patent: May 15, 2018

(54) CONTROL OF SIX STEP PULSE WIDTH MODULATION WITH FLUX WEAKENING

(71) Applicant: GM GLOBAL TECHNOLOGY OPERATIONS LLC, Detroit, MI (US)

(72) Inventors: Dwarakanath V. Simili, Oakland Township, MI (US); Anno Yoo, Rochester Hills, MI (US); Yo Chan Son, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/492,644

(22) Filed: Apr. 20, 2017

(51) Int. Cl.
*H02P 1/00* (2006.01)
*H02P 6/08* (2016.01)

(52) U.S. Cl.
CPC ..................... *H02P 6/08* (2013.01)

(58) Field of Classification Search
CPC ............. H02P 29/0066; H02P 29/0055; H02P 21/148; H02P 21/141; H02P 29/60; H02P 6/08; H02P 29/662; H02P 29/032; H02P 29/64; H02P 2207/05
USPC ....................................................... 318/139
See application file for complete search history.

(56) References Cited

U.S. PATENT DOCUMENTS

| | | | | |
|---|---|---|---|---|
| 6,288,515 B1* | 9/2001 | Hiti | ........................ | H02P 6/085 318/716 |
| 6,388,419 B1* | 5/2002 | Chen | ....................... | B60L 11/14 318/727 |
| 2009/0284195 A1* | 11/2009 | Gallegos-Lopez | ... | B60L 15/025 318/400.02 |
| 2010/0301788 A1* | 12/2010 | Chen | ................... | H02P 21/0003 318/400.3 |
| 2014/0062359 A1 | 3/2014 | Oyobe et al. | | |
| 2015/0236628 A1* | 8/2015 | Wang | .................. | H02M 7/5395 318/139 |
| 2016/0141983 A1* | 5/2016 | Yim | ........................ | H02P 27/08 318/400.02 |
| 2017/0179868 A1* | 6/2017 | Suzuki | .................... | H02P 29/50 |

* cited by examiner

*Primary Examiner* — Bentsu Ro
*Assistant Examiner* — Gabriel Agared
(74) *Attorney, Agent, or Firm* — Quinn IP Law

(57) ABSTRACT

An electric machine assembly includes an electric machine having a stator configured to have a stator current and a controller configured to receive a torque command (T). The controller stores a modulation flag ($F_m$) and a six step active flag ($F_S$), each having a respective status. The controller has a processor and tangible, non-transitory memory on which is recorded instructions for executing a method of controlling a six step pulse width modulation operation in the assembly. The controller is programmed to determine the respective status of a six step active flag ($F_S$) based at least partially on the torque command (T) and the respective status of the modulation flag ($F_m$). The controller is configured to control at least one operating parameter of the electric machine based at least partially on the respective status of the six step active flag ($F_S$).

20 Claims, 2 Drawing Sheets

CONTROL OF SIX STEP PULSE WIDTH MODULATION WITH FLUX WEAKENING

INTRODUCTION

The disclosure relates generally to control of an electric machine assembly, and more particularly, to control of six step pulse width modulation with flux weakening in the assembly. An electric machine, including but not limited to interior permanent magnet machines and induction machines, includes a rotor that is rotatable within a stator. The stator generally includes multiple stator windings and magnetic poles of alternating polarity. Reducing the magnetic flux inside the electric machine at higher speeds improves power characteristics of the electric machine. Flux may be reduced by delivering corresponding voltage limiting commands.

SUMMARY

An electric machine assembly includes an electric machine having a stator configured to have a stator current. A controller is operatively connected to the electric machine and is configured to receive a torque command (T). The controller is configured to store a modulation flag ($F_m$) and a six step active flag ($F_S$), each having a respective status. The controller has a processor and tangible, non-transitory memory on which is recorded instructions for executing a method. The method provides smooth flux weakening functionality when transitioning in and out of six step PWM mode of operation, resulting in drivability improvement such that torque bumps experienced during six step transitions are reduced.

Execution of the instructions by the processor causes the controller to determine a modulation index (M) based at least partially on an available voltage. The controller is programmed to obtain a modified modulation index ($M_R$) based at least partially on a flux weakening reference (FW) at a previous time step (K−1) and the modulation index (M). While the status of the modulation flag ($F_m$) is determined based at least partially on the modified modulation index ($M_R$), the status of the six step active flag ($F_S$) is determined based at least partially on the torque command (T) and the status of the modulation flag ($F_m$). The controller is configured to control at least one operating parameter of the electric machine based at least partially on the respective status of the six step active flag ($F_S$).

Obtaining the modified modulation index ($M_R$) includes: setting the modified modulation index ($M_R$) as a nearest integer value above the modulation index (M), if the flux weakening reference (FW) at the previous time step (K−1) is at or above a first predefined threshold ($R_1$). If the flux weakening reference (FW) at the previous time step (K−1) is below the first predefined threshold ($R_1$), the controller is programmed to set the modified modulation index ($M_R$) as a nearest integer value below the modulation index (M).

Prior to determining the respective status of the modulation flag ($F_m$), the controller is configured to initialize both the respective status of the modulation flag ($F_m$) and the six step active flag ($F_S$) as false. Determining the respective status of the modulation flag ($F_m$) includes setting the respective status of the modulation flag ($F_m$) as true, if the rounded modulation index ($M_R$) is at or above a second predefined threshold ($R_2$). The controller is programmed to set the respective status of the six step active flag ($F_S$) as true, if the torque command (T) is at or above a third predefined threshold ($R_3$) or the modulation flag ($F_m$) is true.

The third predefined threshold ($R_3$) may be obtained from a look-up table based at least partially on a speed of the electric machine and the available DC link voltage.

The controller includes or is operatively connected to a flux weakening regulator. The flux weakening regulator is configured to obtain a flux weakening factor (ΔIs) based at least partially on the torque command (T), a DC link voltage (or battery pack voltage) and a motor speed.

Controlling at least one operating parameter of the electric machine includes selecting parameters for the flux weakening regulator based on the status of the six step active flag ($F_S$). If the six step active flag ($F_S$) is true, the flux weakening regulator may be configured to employ a first voltage limit that is at or above a six step voltage limiting threshold and/or allow the flux weakening factor (ΔIs) to be positive or negative. If the six step active flag ($F_S$) is false, then the flux weakening regulator may be configured to employ a second voltage limit that is below the six step voltage limiting threshold and/or restrict the flux weakening factor (ΔIs) to only negative values. The six step voltage limiting threshold is defined as a product of the DC link voltage and (2/π).

The above features and advantages and other features and advantages of the present disclosure are readily apparent from the following detailed description of the best modes for carrying out the disclosure when taken in connection with the accompanying drawings.

DETAILED DESCRIPTION

Figure 1:
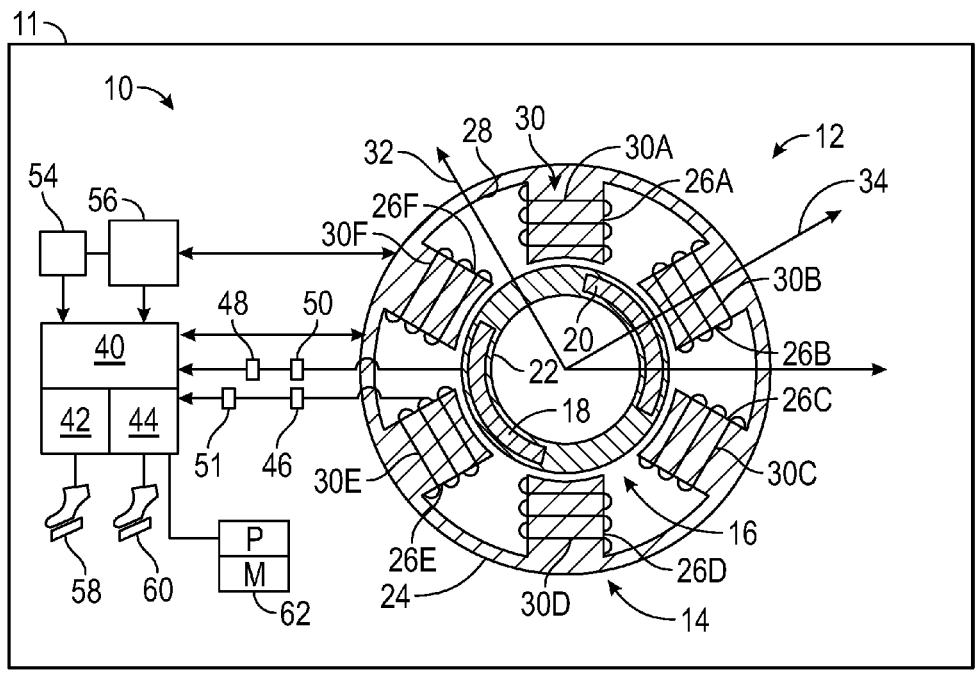
FIG. 1 is a schematic fragmentary partly sectional view of an electric machine assembly having an electric machine and a controller.

Referring to the drawings, wherein like reference numbers refer to like components, FIG. 1 schematically illustrates an electric machine assembly 10. The assembly 10 includes an electric machine 12. The assembly 10 may be a component of a device 11. The device 11 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 11 may be a non-mobile platform. The device 11 may take many different forms and include multiple and/or alternate components and facilities.

Referring to FIG. 1, the electric machine 12 includes a stator 14 and a rotor 16. The rotor 16 may include a first permanent magnet 18 and a second permanent magnet 20 of alternating polarity around the outer periphery of a rotor core 22. The rotor 16 may include as many permanent magnets as required per the application; for simplicity only two are shown. The rotor 16 is rotatable at a rotor speed (w) within the stator 14. While the embodiment shown in FIG. 1 illustrates a three-phase, single pole-pair (i.e. two poles) machine, it is understood that the number of phases or pole pairs may be varied.

The stator 14 includes a stator core 24 which may be cylindrically shaped with a hollow interior. The stator core 24 may include a plurality of inwardly-protruding stator teeth 26A-F, separated by gaps or slots 28. In the embodiment shown in FIG. 1, stator windings 30 may be operatively connected to the stator core 24, such as for example, being coiled around the stator teeth 26A-F. The electric machine 12 may include, but is not limited to, induction and synchronous machines. While an example electric machine 12 is shown, the components illustrated in the FIGS. are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature (q) magnetic axis 32 and a direct (d) magnetic axis 34 are shown. The first and second permanent magnets 18, 20 aid in the creation of a magnetic field and magnetic flux.

Various modulation strategies may be employed to control the output of the electric machine 12. As understood by those skilled in the art, a six step pulse width modulation (PWM) operation is a mode of operation wherein the voltage vector is applied at six intervals (for a 3 phase inverter) during one fundamental cycle (i.e. electrical speed). The six step pulse width modulation (PWM) operation increases the efficiency of the assembly 10 (electric machine 12 plus the pulse width modulation (PWM) inverter 56) at low to light load or torque conditions and for increasing voltage utilization to increase peak torque of the electric machine 12. The six step pulse width modulation (PWM) operation may be employed in a high speed region from zero torque to the peak torque capability of the electric machine 12.

Referring to FIG. 1, the assembly 10 includes a controller 40 operatively connected to or in electronic communication with the electric machine 12. The controller 40 is configured to receive a torque command (T). Referring to FIG. 1, the controller 40 includes at least one processor 42 and at least one memory 44 (or non-transitory, tangible computer readable storage medium) on which are recorded instructions for executing method 100, shown in FIG. 3, for controlling the six step pulse width modulation operation for flux weakening. The memory 44 can store controller-executable instruction sets, and the processor 42 can execute the controller-executable instruction sets stored in the memory 44.

The controller 40 of FIG. 1 is specifically programmed to execute the blocks of the method 100 (as discussed in detail below with respect to FIG. 3) and can receive inputs from various sensors. Referring to FIG. 1, the assembly 10 may include a stator winding temperature sensor 46, a rotor temperature sensor 48, a magnetic flux sensor 50, each capable of measuring a respective physical factor and sending a respective signal to the controller 40. Additionally, controller 40 may be programmed to determine the respective physical factors by modeling or other estimation technique available to those skilled in the art. The assembly 10 may include a rotor position transducer 51 that measures the position of the rotor 16 and generates a rotor position signal. A battery pack 54 may be operatively connected to the electric machine 12 as a source of DC link voltage. A pulse width modulated (PWM) inverter 56 may be operatively connected to the controller 40 and battery pack 54, and configured to convert DC to AC current.

The method 100 improves functioning of the assembly 10 by enabling transition in and out of a six step pulse width modulation operation mode based on operating conditions of the electric machine 12. The method 100 generates a dynamic reference factor, taking into account operating conditions, for smooth transitions in and out of six step operations. The dynamic reference factor can then be consumed by an enhanced flux weakening regulator or other mechanism that requires a trigger to switch to the six step pulse width modulation. The method 100 is configured to eliminate torque bumps (chatter') experienced during transitions in and out of the six step mode of operation.

The controller 40 is programmed or configured to receive a torque command (T). The torque command (T) may be received by the controller 40 in response to an operator input or an automatically-fed input condition monitored by the controller 40. If the device 11 is a vehicle, the controller 40 may determine the torque command (T) based on input signals from an operator through an accelerator pedal 58 and brake pedal 60, shown in FIG. 1. Additionally, the controller 40 is configured to store a modulation flag ($F_m$) and a six step active flag ($F_S$), each having a respective status.

Figure 2:
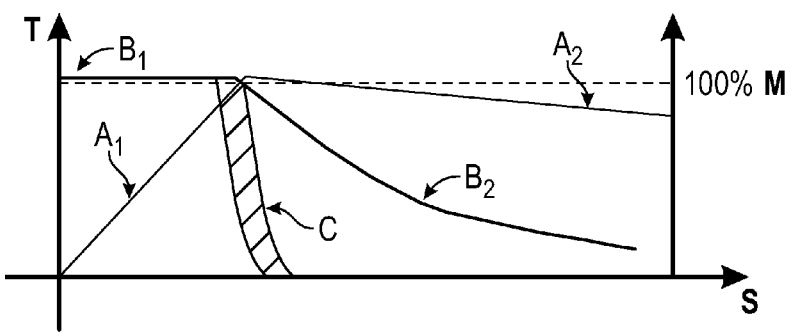
FIG. 2 is an example graph showing torque (T) and modulation index value (M) on the vertical axes, and electric motor speed (S) in the horizontal axis.
Figure 3:
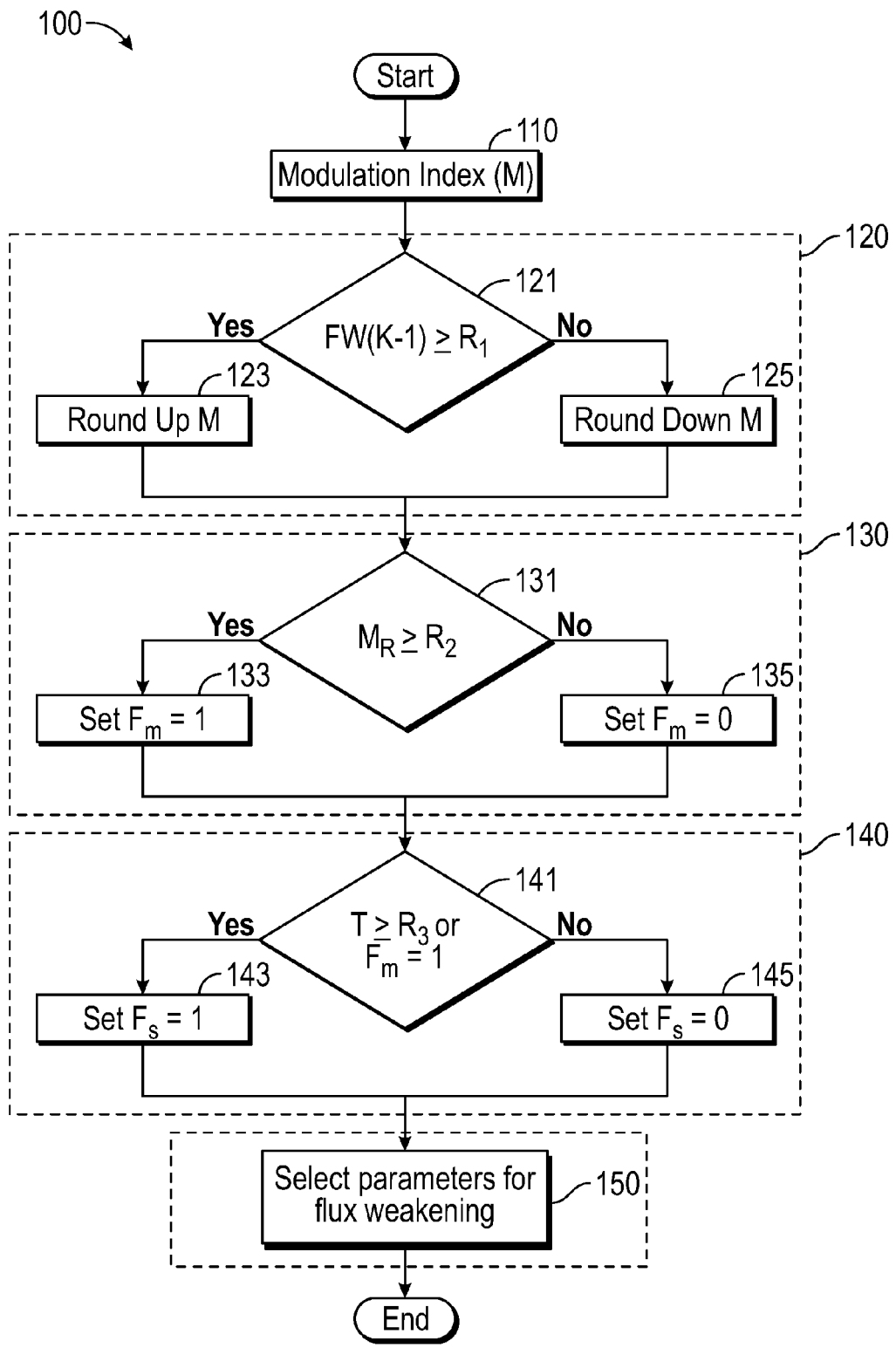
FIG. 3 is a flowchart for a method executable by the controller of FIG. 1.

Referring now to FIG. 3, a flowchart of the method 100 stored on and executable by the controller 40 of FIG. 1 is shown. Method 100 need not be applied in the specific order recited herein. Furthermore, it is to be understood that some blocks may be eliminated. In block 110 of FIG. 3, the controller 40 is configured to determine a modulation index (M) based at least partially on an applied steady state voltage and an available voltage of the electric machine 12. In one example, the modulation index (M) is a percentage value of the ratio of the applied steady state voltage over the available voltage. Referring to FIG. 2, traces $A_1$ and $A_2$ show an example modulation index (M), in percentage, as a function of electric motor speed (S). Traces $B_1$ and $B_2$ show torque command (T) (or available torque) as a function of electric motor speed (S). Referring to FIG. 2, region C indicates the six step transition region.

In block 120 of FIG. 3, the controller 40 is configured to obtain a modified modulation index ($M_R$) based at least partially on a flux weakening reference at a previous time step (K−1) and the modulation index (M). Block 120 may include sub-blocks 121, 123, 125, as described below.

In sub-block 121, the controller 40 is programmed to determine if the flux weakening reference at the previous time step (K−1) is at or above a first predefined threshold ($R_1$). If so, in sub-block 123, the modified modulation index ($M_R$) is set as a nearest integer value above the modulation index (M) (i.e., rounded up). If not, in sub-block 125, the controller 40 is programmed to set the modified modulation index ($M_R$) as a nearest integer value below the modulation index (M) (i.e., rounded down). In one example, the first predefined threshold ($R_1$) is selected as 1.2. It is to be understood that each of the first, second and third predefined thresholds ($R_1$, $R_2$, $R_3$) may be selected based on the application at hand.

In block 130 of FIG. 3, the controller 40 is configured to determine the respective status of the modulation flag ($F_m$) based at least partially on the modified modulation index ($M_R$). Block 130 may include sub-blocks 131, 133, 135, as described below. Prior to determining the respective status of the modulation flag ($F_m$), the controller 40 may be configured to initialize both the respective status of the modulation flag ($F_m$) and the six step active flag ($F_S$) as false.

In sub-block 131, the controller 40 is programmed to determine if the rounded modulation index ($M_R$) is at or above a second predefined threshold ($R_2$). If so, in sub-block 133, the controller 40 is programmed to set the respective status of the modulation flag ($F_m$) as true. If not, in sub-block 135, the controller 40 is programmed to set (or let remain) the respective status of the modulation flag ($F_m$) as false. In a non-liming example, the second predefined threshold ($R_2$) may be 98%.

In block 140 of FIG. 3, the controller 40 is configured to determine the respective status of the six step active flag ($F_S$) based at least partially on the torque command (T) and the respective status of the modulation flag ($F_m$). Block 140 may include sub-blocks 141, 143, 145, as described below.

In sub-block 141, the controller 40 is programmed to determine if a torque command (T) is at or above a third predefined threshold ($R_3$) or the modulation flag ($F_m$) is true. If so, the respective status of the six step active flag ($F_S$) is set as true, per sub-block 143. If not, in sub-block 145, the controller 40 is programmed to set (or let remain) the respective status of the six step active flag ($F_S$) as false. The third predefined threshold ($R_3$) may be obtained from a look-up table based at least partially on a speed of the electric machine 12 and the available voltage (e.g. battery voltage). The term "look-up table" is intended to represent table, data repository or other data storage available to those skilled in the art. The look-up table may be obtained in a testing dynamo or lab conditions. A non-limiting example of a look-up table for the third predefined threshold ($R_3$) is shown below in Table 1. For example, the third predefined threshold ($R_3$) may be 300 for a speed of 2000 rpm and an applied voltage of 400 V.

TABLE 1

| Voltage/Speed | 1000 rpm | 2000 rpm | 6000 rpm |
|---|---|---|---|
| 250 V | 350 | 280 | 0 |
| 300 V | 350 | 285 | 0 |
| 350 V | 350 | 290 | 0 |
| 400 V | 350 | 300 | 0 |

Referring now to FIG. 1, the assembly 10 may include a flux weakening regulator 62 (having a processor P and memory M). The flux weakening regulator 62 may be operatively connected to the controller 40 or may be an integral part of the controller 40. The flux weakening regulator 62 may be a proportional-integral (PI) unit, with positive and negative limits at its output, as understood by those skilled in the art.

In block 150 of FIG. 3, the controller 40 is configured to control at least one operating parameter of the electric machine 12, which includes selecting parameters for the flux weakening regulator 62 based on the status of the six step active flag ($F_S$). If the six step active flag ($F_S$) is true, then the flux weakening regulator 62 is configured to employ a first voltage limit that is at or above a six step voltage limiting threshold and/or allow the flux weakening factor ($\Delta Is$) to be positive or negative. The six step voltage limiting threshold is defined as a product of the DC link voltage and ($2/\pi$). For example, the first voltage limit may be 105% of the six step voltage limiting threshold.

If the six step active flag ($F_S$) is false, then the flux weakening regulator 62 is configured to employ a second voltage limit that is below the six step voltage limiting threshold and/or restrict the flux weakening factor ($\Delta Is$) to negative values. For example, the second voltage limit may be 97% of the six step voltage limiting threshold.

In one embodiment, if the six step active flag ($F_S$) is true, the flux weakening factor ($\Delta Is$) is given a positive limit of 60 ampere, a negative limit of −60 A and a six step flux weakening command value (1.2). In this embodiment, if the six step active flag ($F_S$) is false, the flux weakening factor ($\Delta Is$) is given a positive limit of zero amperes, a negative limit of −60 A and a non-six step flux weakening command value (0.93).

The flux weakening regulator 62 of FIG. 1 is configured to generate the flux weakening factor ($\Delta Is$) based at least partially on the torque command (T), DC link voltage and motor speed, and modify the stator current commands ($I_{Scmd}$) from predefined look-up tables. The modified stator current command may be sent to a current regulator (not shown) for controlling the electric machine 12, in order to achieve improved high speed current control and improved motor torque linearity for the electric machine 12. In the embodiment shown, the flux weakening reference (FW) (described above in block 120) is the same as the flux weakening factor ($\Delta Is$) determined in a previous cycle, i.e., at a previous time step (K−1).

Obtaining the flux weakening factor ($\Delta Is$) may include: generating respective d-axis and q-axis command voltages based on the torque command (T) and the DC link voltage. The DC link voltage may be provided by the battery pack 54. A voltage magnitude ($V_m$) is generated based on the respective d-axis and q-axis command voltages. The flux weakening factor ($\Delta Is$) is then generated on a comparison of the voltage magnitude ($V_m$) and a predefined reference voltage ($V_{ref}$). The reference voltage ($V_{ref}$) may be selected based on the application. The controller 40 may rely on a look-up table or data repository generated in a dynamo or test cell conditions or other method available to those skilled in the art. The flux weakening factor ($\Delta Is$) may be obtained as the output of other flux weakening control modules available to those skilled in the art.

In summary, the method 100 enables smooth current control when transitioning in and out of six step PWM operation in an electric machine 12. This is achieved by dynamically selecting parameters for the flux weakening regulator 62 based at least partially on a modulation index (M) at a steady state, and the respective status of the six step active flag ($F_S$), as described below in the flowchart of FIG. 3. Based on the status of the six step active flag ($F_S$), a single flux weakening regulator 62 that covers both six step and non-six step modes of operation may be used, thereby reducing calibration and motor controls complexity. The method 100 allows reduction in calibration tuning iterations to achieve desired current control performance across all operating conditions.

The controller 40 of FIG. 1 may be an integral portion of, or a separate module operatively connected to, other controllers of the assembly 10. The controller 40 (and proportional-integral (PI) regulator 62) of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric machine assembly comprising:
   an electric machine including a stator configured to have a stator current;
   a controller operatively connected to the electric machine and configured to receive a torque command (T), the controller being configured to store a modulation flag ($F_m$) and a six step active flag ($F_S$) each having a respective status;
   wherein the controller has a processor and tangible, non-transitory memory on which is recorded instructions for executing a method of controlling a six step pulse width modulation operation in the assembly, execution of the instructions by the processor causing the controller to:
      obtain a modified modulation index ($M_R$) based at least partially on a flux weakening reference (FW) at a previous time step (K−1) and a modulation index (M);
      determine the respective status of the modulation flag ($F_m$) based at least partially on the modified modulation index ($M_R$);
      determine the respective status of the six step active flag ($F_S$) based at least partially on the torque command (T) and the respective status of the modulation flag ($F_m$); and
   wherein the controller is configured to control at least one operating parameter of the electric machine based at least partially on the respective status of the six step active flag ($F_S$).

2. The assembly of claim 1, wherein said obtaining the modified modulation index ($M_R$) includes:
   determining a modulation index (M) based at least partially on an available voltage;
   if the flux weakening reference (FW) at the previous time step (K−1) is at or above a first predefined threshold ($R_1$), setting the modified modulation index ($M_R$) as a nearest integer value above the modulation index (M); and
   if the flux weakening reference (FW) at the previous time step (K−1) is below the first predefined threshold ($R_1$), setting the modified modulation index ($M_R$) as a nearest integer value below the modulation index (M).

3. The assembly of claim 1, wherein prior to said determining the respective status of the modulation flag ($F_m$), the controller is configured to:
   initialize both the respective status of the modulation flag ($F_m$) and the six step active flag ($F_S$) as false.

4. The assembly of claim 1, wherein said determining the respective status of the modulation flag ($F_m$) includes:
   if the rounded modulation index ($M_R$) is at or above a second predefined threshold ($R_2$), then setting the respective status of the modulation flag ($F_m$) as true.

5. The assembly of claim 1, wherein said determining the respective status of the six step active flag ($F_S$) includes:
   if the torque command (T) is at or above a third predefined threshold ($R_3$) or the modulation flag ($F_m$) has a respective status of true, then setting the respective status of the six step active flag ($F_S$) as true.

6. The assembly of claim 5, wherein the third predefined threshold ($R_3$) is obtained from a look-up table based at least partially on a speed of the electric machine and the applied voltage.

7. The assembly of claim 1, wherein:
   the controller includes or is operatively connected to a flux weakening regulator, the flux weakening regulator being configured to generate a flux weakening factor (ΔIs) based at least partially on the torque command (T), a DC link voltage and a motor speed.

8. The assembly of claim 7, wherein said generating the flux weakening factor (ΔIs) includes:
   generating respective d-axis and q-axis command voltages based on the torque command (T) and the DC link voltage;
   generating a voltage magnitude based on the respective d-axis and q-axis command voltages;
   generating the flux weakening factor (ΔIs) based on a comparison of the voltage magnitude and a predefined reference voltage.

9. The assembly of claim 7, further comprising:
   a battery pack operatively connected to the controller and configured to provide the DC link voltage; and
   a pulse width modulator (PWM) inverter operatively connected to the controller and the battery pack.

10. The assembly of claim 7, wherein said controlling at least one operating parameter of the electric machine includes selecting parameters for the flux weakening regulator based on the status of the six step active flag ($F_S$) such that:
    if the six step active flag ($F_S$) has a respective status of true, then configuring the flux weakening regulator to employ a first voltage limit that is at or above a six step voltage limiting threshold;
    if the six step active flag ($F_S$) has a respective status of false, then configuring the flux weakening regulator to employ a second voltage limit that is below the six step voltage limiting threshold; and wherein the six step voltage limiting threshold is defined as a product of the DC link voltage and $(2/\pi)$.

11. The assembly of claim 7, wherein said controlling at least one operating parameter of the electric machine includes selecting parameters for the flux weakening regulator based on the status of the six step active flag ($F_S$) such that:
   if the six step active flag ($F_S$) is true, then configuring the flux weakening regulator to allow the flux weakening factor ($\Delta$Is) to be positive or negative; and
   if the six step active flag ($F_S$) is false, then configuring the flux weakening regulator to restrict the flux weakening factor ($\Delta$Is) to only negative values.

12. A method of controlling an electric machine assembly, the electric machine assembly including an electric machine with a stator configured to have a stator current, a controller configured to receive a torque command (T), the controller having a processor and tangible, non-transitory memory, the method comprising:
   obtaining a modified modulation index ($M_R$) based at least partially on a flux weakening reference (FW) at a previous time step (K–1) and a modulation index (M);
   storing a modulation flag ($F_m$) and a six step active flag ($F_S$), each having a respective status, in the controller;
   determining the respective status of the modulation flag ($F_m$) based at least partially on the modified modulation index ($M_R$);
   determining the respective status of the six step active flag ($F_S$) based at least partially on the torque command (T) and the respective status of the modulation flag ($F_m$); and
   controlling at least one operating parameter of the electric machine based at least partially on the respective status of the six step active flag ($F_S$).

13. The method of claim 12, wherein said obtaining the modified modulation index ($M_R$) includes:
   determining a modulation index (M) based at least partially on an applied steady state voltage and an available voltage;
   if the flux weakening reference (FW) at the previous time step (K–1) is at or above a first predefined threshold ($R_1$), setting the modified modulation index ($M_R$) as a nearest integer value above the modulation index (M); and
   if the flux weakening reference (FW) at the previous time step (K–1) is below the first predefined threshold ($R_1$), setting the modified modulation index ($M_R$) as a nearest integer value below the modulation index (M).

14. The method of claim 12, wherein:
   said determining the respective status of the modulation flag ($F_m$) includes setting the respective status of the modulation flag ($F_m$) as true, if the rounded modulation index ($M_R$) is at or above a second predefined threshold ($R_2$); and
   wherein said determining the respective status of the six step active flag ($F_S$) includes setting the respective status of the six step active flag ($F_S$) as true, if the torque command (T) is at or above a third predefined threshold ($R_3$) or the modulation flag ($F_m$) has a respective status of true.

15. The method of claim 12, wherein said controlling at least one operating parameter of the electric machine includes selecting parameters for the flux weakening regulator based on the status of the six step active flag ($F_S$) such that:
   if the six step active flag ($F_S$) has a respective status of true, then configuring the flux weakening regulator to employ a first voltage limit that is at or above a six step voltage limiting threshold;
   if the six step active flag ($F_S$) has a respective status of false, then configuring the flux weakening regulator to employ a second voltage limit that is below the six step voltage limiting threshold; and
   wherein the six step voltage limiting threshold is defined as a product of the DC link voltage and $(2/\pi)$.

16. The method of claim 12, wherein said controlling at least one operating parameter of the electric machine includes selecting parameters for the flux weakening regulator based on the status of the six step active flag ($F_S$) such that:
   if the six step active flag ($F_S$) is true, then configuring the flux weakening regulator to allow the flux weakening factor ($\Delta$Is) to be positive or negative; and
   if the six step active flag ($F_S$) is false, then configuring the flux weakening regulator to restrict the flux weakening factor ($\Delta$Is) to only negative values.

17. An electric machine assembly comprising:
   an electric machine including a stator configured to have a stator current;
   a controller operatively connected to the electric machine and configured to receive a torque command (T), the controller being configured to store a modulation flag ($F_m$) and a six step active flag ($F_S$) each having a respective status;
   wherein the controller has a processor and tangible, non-transitory memory on which is recorded instructions for executing a method of controlling a six step pulse width modulation operation in the assembly, execution of the instructions by the processor causing the controller to:
   determine a modulation index (M) based at least partially on an available voltage;
   obtain a modified modulation index ($M_R$) based at least partially on a flux weakening reference at a previous time step (K–1) and the modulation index (M);
   determine the respective status of the modulation flag ($F_m$) based at least partially on the modified modulation index ($M_R$);
   determine the respective status of the six step active flag ($F_S$) based at least partially on the torque command (T) and the respective status of the modulation flag ($F_m$);
   wherein the controller is configured to control at least one operating parameter of the electric machine based at least partially on the respective status of the six step active flag ($F_S$); and
   wherein said obtaining the modified modulation index ($M_R$) includes:
   if the flux weakening reference (FW) at the previous time step (K–1) is at or above a first predefined threshold ($R_1$), setting the modified modulation index ($M_R$) as a nearest integer value above the modulation index (M); and
   if the flux weakening reference (FW) at the previous time step (K–1) is below the first predefined threshold ($R_1$), setting the modified modulation index ($M_R$) as a nearest integer value below the modulation index (M).

18. The assembly of claim 17, wherein:
said determining the respective status of the modulation flag ($F_m$) includes setting the respective status of the modulation flag ($F_m$) as true, if the rounded modulation index ($M_R$) is at or above a second predefined threshold ($R_2$); and said determining the respective status of the six step active flag ($F_S$) includes setting the respective status of the six step active flag ($F_S$) as true, if the torque command (T) is at or above a third predefined threshold ($R_3$) or the modulation flag ($F_m$) has a respective status of true.

19. The assembly of claim 17, wherein:

the controller includes or is operatively connected to a flux weakening regulator, the flux weakening regulator being configured to generate a flux weakening factor (ΔIs) based at least partially on the torque command (T), a DC link voltage and a motor speed.

20. The assembly of claim 17, wherein said controlling at least one operating parameter of the electric machine includes selecting parameters for the flux weakening regulator based on the status of the six step active flag ($F_S$) such that:

if the six step active flag ($F_S$) has a respective status of true, then configuring the flux weakening regulator to employ a first voltage limit that is at or above a six step voltage limiting threshold and allow the flux weakening factor (ΔIs) to be positive or negative;

if the six step active flag ($F_S$) has a respective status of false, then configuring the flux weakening regulator to employ a second voltage limit that is below the six step voltage limiting threshold and restrict the flux weakening factor (ΔIs) to only negative values; and wherein the six step voltage limiting threshold is defined as a product of the DC link voltage and ($2/\pi$).

* * * * *